United States Patent

Herweg et al.

[11] 3,931,098
[45] Jan. 6, 1976

[54] METHOD FOR PRODUCING WEBS, PANELS OR SANDWICH ELEMENTS OF FOAM PLASTICS REINFORCED WITH ROVINGS

[75] Inventors: Peter Herweg, Burscheid; Franz Prager, Opladen, both of Germany

[73] Assignee: Bayer Aktiengesellschaft, Leverkusen, Germany

[22] Filed: Feb. 12, 1974

[21] Appl. No.: 441,933

[30] Foreign Application Priority Data
Feb. 15, 1973 Germany............................ 2307490

[52] U.S. Cl. ............... 264/45.3; 264/45.8; 264/309
[51] Int. Cl.² .......................................... B29H 7/20
[58] Field of Search ....... 264/45, 47, 310, 311, 309, 264/DIG. 72, DIG. 53, 45.3, 45.8; 156/62.4, 62.6, 166, 167

[56] References Cited
UNITED STATES PATENTS

| | | |
|---|---|---|
| 3,084,973 | 4/1963 | Beckley ............................ 264/45 |
| 3,172,072 | 3/1965 | Willy..................................... 264/47 |
| 3,378,613 | 4/1968 | Hampshire........................... 264/45 |
| 3,684,415 | 8/1972 | Buntin et al. ....................... 156/167 |
| 3,691,004 | 9/1972 | Werner et al. ...................... 156/167 |
| 3,854,917 | 12/1974 | McKinney et al. ................. 156/167 |

OTHER PUBLICATIONS

E. S. Mylis, "Sprayed Reinforced Plastics," The Glass Industry, Oct. 1961, pp. 581–584.
"Spray Up," Modern Plastics, Sept. 1961, pp. 89–92.

*Primary Examiner*—Robert F. White
*Assistant Examiner*—T. E. Balhoff
*Attorney, Agent, or Firm*—Joseph C. Gil

[57] ABSTRACT

Means for producing fiber-reinforced foam plastic webs, panels, sandwich panels and the like from continuous rovings and a foam reaction mixture. Rovings are incorporated into a foam product or core by means of an air nozzle coupled to and adjustable in its position to the nozzle of a mixing head for ejecting the foam reaction mixture.

1 Claim, 12 Drawing Figures

METHOD FOR PRODUCING WEBS, PANELS OR SANDWICH ELEMENTS OF FOAM PLASTICS REINFORCED WITH ROVINGS

BACKGROUND OF THE INVENTION

This invention relates to a method and an apparatus for the batch-wise or continuous production of webs, panels or sandwich elements of foam plastics reinforced with rovings and in particular with glass fiber rovings, in which method the rovings are deposited on a support and permeated with a foam produced from a reaction mixture ejected from a nozzle. The apparatus according to the invention for carrying out the process batch-wise comprises a mold, with or without a cover, above which a displaceable mixing head is arranged. The apparatus for carrying out the process continuously comprises a conveyor belt with raised edges to limit its width and optionally a covering belt, and a mixing head which is reciprocally movable transversely to the direction of delivery and which is arranged above the conveyor belt.

It is generally desired that webs or panels of foam plastics or the foam plastic core of sandwich elements which have covering layers on either side of the core be reinforced with fiber inserts. These fiber inserts usually consist of glass fiber mats of fiber fleeces. They generally produce a foam of higher density in the marginal zones of the foam plastic product or of the foam core of a sandwich element. Additionally, if these mats or fleeces cannot be fixed to the internal surfaces of covering layers, they are liable to become displaced when the reaction mixture is introduced or when it foams up. It is not always desired to produce foam products or foam cores which have a higher density in the marginal zones. In such cases it has previously been necessary to introduce chopped rovings into the foaming mixture or to produce fiber mats substantially equal in thickness to the finished webs or panels of foam. In the former case, the chopped rovings are liable to be unevenly distributed when the reaction mixture foams up. In the second case, it is extremely difficult to produce glass fiber mats of the required thickness, for example, 4 cm or more, store them and then work them up as required without the mats suffering any loss in thickness. Even if this were easy to carry out, the mats would still be liable to be deformed by the reaction mixture as it foams up. When the foams are to be reinforced with mats and fiber fleeces, the dense arrangement of the fibers makes it difficult for the foaming mixture to penetrate the gaps between the fibers. This inability of the foam to pass through the gaps between the fibers causes the undesirable displacement of the mats and fleeces.

Due to the difficulties mentioned above, the fiber reinforced foam products or sandwich elements do not have sufficiently long fire resistance. It has been found, however, that the fire resistance can advantageously be increased by avoiding the formation of cracks which is liable to occur in the aforesaid products if they are exposed to heat. The reason for this is that early destruction of the foam begins at these cracks.

It is therefore, an object of this invention to provide means by which webs, panels or sandwich elements of foam plastics reinforced with rovings and in particular with glass fiber rovings can be produced in such a way that they will have a high resistance to the formation of cracks. The important properties which are desired to be achieved are not only a high resistance to mechanical stress in general, but in particular an improved fire resistance.

SUMMARY OF THE INVENTION

The problems of the prior art are solved according to the invention by directing continuous rovings onto a suitable support and permeating the rovings with a foam from a foamable reaction mixture. The rovings are delivered and directed onto the support by means of an air nozzle which is arranged so that the distance between the mouth of this nozzle and the mouth of the nozzle used for applying the mixture may be accurately adjusted according to the desired density of distribution of the rovings over the cross-section of the web.

The air nozzle is coupled to the mixing head for the reaction mixture in the sense that it is attached to the mixing head by means of an actual physical connection or is so arranged as that its movement or positioning is contiguous with that of the mixing head.

By observing this basic requirement, endless rovings can be distributed as desired over the cross-section of a molded foam product or foam core. It is found to be particularly advantageous that the rovings can be introduced at the same time that the foam product is being produced. It is, therefore, not necessary first to produce suitable mats or fleeces and then store them and later introduce them into the foaming apparatus by means of additional complicated and space-consuming apparatus.

Nor is it necessary to fix the rovings with a binder as is the case with known processes wherein reinforcements produced from endless threads are permeated with foam. These latter reinforcements are semi-finished products in which the points of intersection of the threads must be fixed by a binder before the reinforcement can be placed in the foaming mold and permeated with foam.

If the products are produced on a conveyor belt with a mixing head arranged above it, the distance between the mouth of the air nozzle and the mouth of the mixing nozzle may be adjusted between two extreme positions. In one extreme position, viewed in the direction of transport of the belt, the mouth of the mixing head is situated behind the mouth of the air nozzle at a distance of up to 500 mm, preferably 300 mm. In the second extreme position, the mouth of the air nozzle is situated behind the mouth of the mixing head at a distance of up to 300 mm, preferably about 200 mm.

Within this wide range of adjustments, the following procedures are possible.

According to one special method, the rovings are deposited first, that is to say both rovings and reaction mixture are deposited throughout the process but with a time lag so that first rovings are deposited on the support and then the reaction mixture is poured on the rovings, the time lag depending on the selected distance between the mouths of the nozzles. The greater the selected distance between the nozzles, which may be about 400 mm or even more, the larger and flatter will be the loops of the rovings deposited on the support. The deposited, crimped rovings have sufficient time to settle flat on the support so that during the foaming process most of the rovings remain close to the support.

According to another method, the reaction mixture is first applied, that is to say here again both reaction mixture and rovings are deposited simultaneously throughout the process but with a time lag so that the reaction mixture is the first to reach the support. In this case, the rovings are mainly pushed to the top of the web or panel during the foaming process.

The degree to which the rovings deposited on the support will be heaped up can be adjusted by adjusting the angle of the air nozzle. The loops of the rovings will be heaped up or lie flat according to the angle of inclination of the nozzle. This bunching up of the rovings depends on various factors, for example, the diameter of the rovings, their rigidity and the rate at which they are delivered from the nozzle. The angle of inclination of the air nozzle required for obtaining the desired result can be determined empirically but in principle it may be said that the flatter the air nozzle lies in relation to the support the flatter will be the loops deposited on the support. If, on the other hand, the nozzle is practically perpendicular to the support, then the rovings will be more heaped up.

If it is desired to produce a foam plastics product or core in which the rovings are distributed as far as possible homogeneously over the cross-section, then according to another special method of the invention, the rovings and reaction mixture are deposited simultaneously at the same position. In this situation, the air nozzle must be set at such an angle to the mixing nozzle and arranged at such a distance from it that both the rovings and the mixture encounter the support in the same spot. For this purpose it is preferable to use two air nozzles arranged one to the right and one to the left of the mixing head.

Starting from this mid-position between the two extreme end positions, the quantity of rovings per cross-sectional area of the product can be varied over the height of the product to increase or decrease towards the bottom or top. If it is also desired to vary the fiber content over the length of the panel, this can be achieved by adjusting the draw-off rate of the rovings.

Structural elements in which the fire resistance conforms to the standards of DIN 4102 or even exceeds them can easily be produced by the process according to the invention. Whereas an increase in thickness of foam plastics which have not been reinforced does not result in any substantial increase in the length of fire resistance because of the cracks which are formed when such materials are tested for their fire resistance, the introduction of endless threads according to the invention results in a substantial increase in the fire resistance. This fire resistance may be increased even further by increasing the thickness of the reinforced foam products or reinforced foam cores so produced.

Foams suitable for reinforcement according to the invention are so-called hard foams known in the art and are produced from foamable reaction mixtures, for example, polyester, polyurethane and polyisocyanurate foams, especially those which themselves have a high fire resistance. If the rovings are intended to serve merely for mechanical reinforcement, either glass fiber rovings or any type of synthetic or natural fibers in the form of rovings may be used. If it is desired to increase the fire resistance, on the other hand, the rovings must have a high melting point and flash point so that they will act as fire retarders. Suitable synthetic fibers or asbestos fibers must then be used. Glass fiber rovings are particularly suitable for this purpose.

When producing sandwich elements, any of the materials known in the art may be used for the covering layers, depending on the properties required of the product. Materials suitable for use as covering layers are, for example, impregnated paper foils, plastics foils, metal sheets such as aluminium sheet or steel sheet, wood veneer and the like.

DETAILED DESCRIPTION

The apparatus according to the invention for carrying out the process batch-wise is characterized in that at least one rovings delivery device consisting of an air nozzle which is adjustable in its position relative to the delivery nozzle of the mixing head is coupled with the mixing head.

The apparatus according to the invention for carrying out the process continuously is characterized in that the mixing head is coupled with at least one rovings delivery device comprising an air nozzle which is adjustable in its position relative to the delivery nozzle of the mixing head.

The advantages arising from this constructional invention have already been described in connection with the process according to the invention.

The rovings delivery device is preferably attached to the mixing head by way of a pivotal arm which can be fixed in position.

The pivotal arm is therefore capable of pivoting about the mixing head so that the air nozzle is adjustable between the extreme end positions in front of and behind the mixing head. At the same time, the air nozzle can preferably be adjusted on the pivotal arm to adjust its distance to the mixing head. This is most easily achieved by means of an adjustment clamp.

The pivotal arm and the clamping member are provided with a tilting joint to adjust the angle of inclination of the air nozzle.

BRIEF DESCRIPTION OF THE DRAWINGS

The drawings shown purely diagrammatically an example of an intermittently operating apparatus and an example of a continuously operating apparatus.

In FIG. 1, a frame 2 is arranged above a mold 1 and a carriage 3 is longitudinally displaceable on the frame 2. A mixing head 4 which is reciprocally movable in the transverse direction is provided on the carriage 3. This mixing head 4 is supplied with components of the reaction mixture from pipes 5 and 6.

Figure 1:
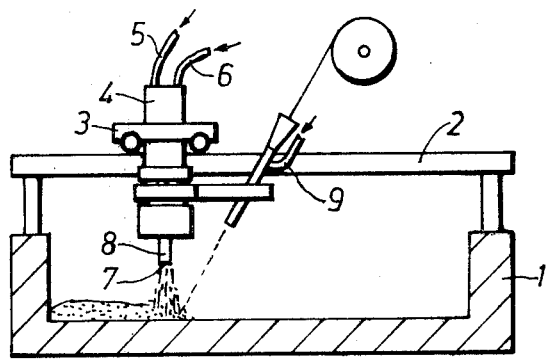
FIG. 1 represents an intermittently operating apparatus.

The mouth 7 of the mixing nozzle 8 is directed vertically into the mold 2. The mold 2 may be adapted to be closed by a cover (not shown). A rovings delivery device 9 is coupled with the mixing head 4. Its representative construction is illustrated in FIG. 3.

Figure 2:
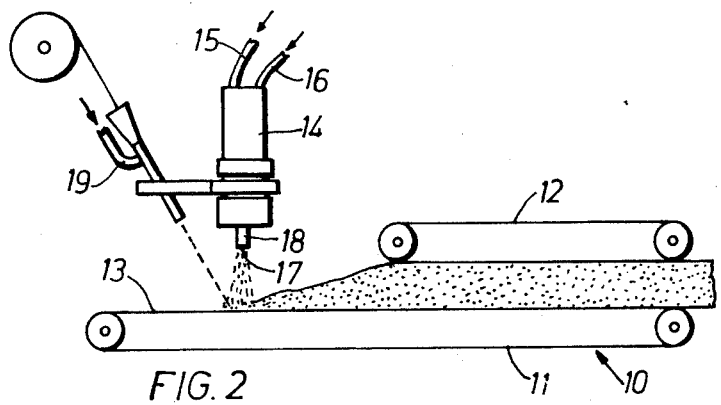
FIG. 2 represents a continuously operating apparatus.

FIG. 2 shows a double conveyor belt 10 comprising a lower belt 11 and upper belt 12. Side partitions (not shown) are employed between the upper and lower conveyor belts to confine the foamable reaction mixture. A mixing head 14 which is reciprocally movable in the transverse direction and supplied with reactants from pipes 15 and 16 is situated above the inlet end 13 of the lower belt 11. The mouth 17 of the mixing nozzle 18 is directed substantially vertically down to the lower belt 11. A rovings delivery device 19 is coupled with the mixing head 14. Its representative construction is shown in FIG. 3.

Figure 3:
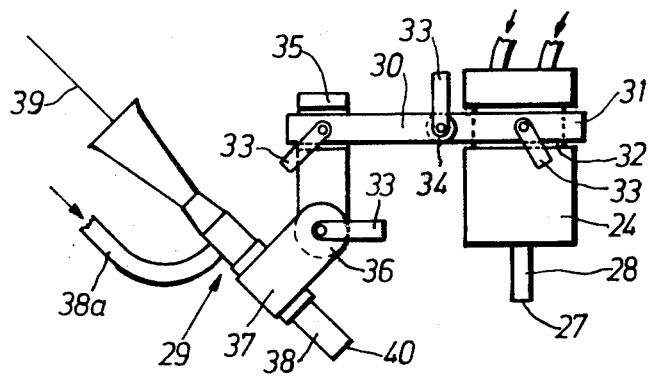
FIG. 3 shows how the device for delivering the rovings is coupled to the mixing head and FIGS. 4 to 10 shown various positions of the air nozzle in relation to the mixing head.

In FIG. 3, the rovings delivery device 29 is pivotally attached to the mixing head 24 by means of a swivel arm 30 which ends in a ring 31 which is adapted to pivot about an annular recess 32 on the circumference of the mixing head 24 and which can be fixed in position by means of a screw clamp 33.

At a point just before the swivel arm 30 becomes the ring 31 there is a joint 34 which also is adapted to be fixed in position by a screw clamp 33. The swivel arm 30 supports a clamping member 35 which can be fixed by another screw clamp 33. A support 37 for an air nozzle 38 with air supply 38a is fixed to the clamping member 35 in a position which can be adjusted by a joint 36 with clamping lever 33. The swivel arm 30 enables the air nozzle 38 to be adjusted in any desired direction to the mouth 27 of the outlet nozzle 28 of the mixing head. The distance to the mixing head 24 can be adjusted by means of the adjustable clamping member 35 and the angle of delivery of the rovings 39 as well as the exact distance of the mouth 40 of the air nozzle 30 to the mouth 27 of the mixing nozzle 28 can be adjusted by means of the joints 34 and 36.

In cases where two air nozzles 38 are provided, the rovings delivery device shown in FIG. 3 is duplicated, with one such device arranged on each side of the mixing head 24.

FIGS. 4 to 10 show the most important positions of adjustment of the air nozzle 38 to the mixing head 24 used in conjunction with a double conveyor belt, the drawings indicating only the lower belt 11 and its direction of movement.

Figure 4:
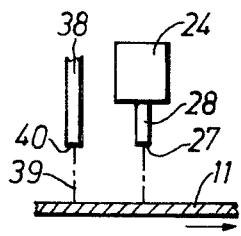

In FIG. 4, the air nozzle 38 is arranged at the upstream end and the mixing head 24 is arranged behind it. The air nozzle 38 is placed vertically. When the rovings 39 are deposited, they form almost circular loops. The distance of the mouth 40 of the air nozzle 38 to the mouth 27 of the outlet nozzle 28 for the mixture is approximately 30 mm.

Figure 5:
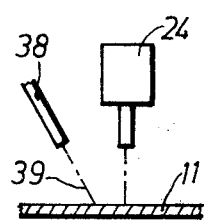

FIG. 5 shows the air nozzle 38 in an intermediate position. The rovings 39 are in this case deposited as elliptical loops.

Figure 6:
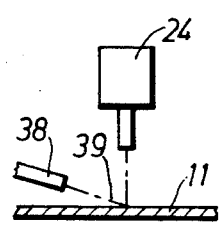

In FIG. 6, the arrangement of the air nozzle 38 is extremely flat. The rovings 39 are deposited in long, flat loops.

Using the adjustments shown in FIGS. 4 to 6, the rovings 39 remain mainly in the lower region of the foam during the foaming process.

Figure 7:
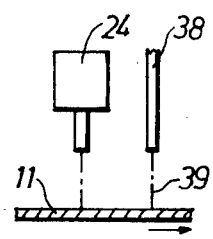

In FIG. 7, the mixing head 24 is arranged at the upstream end so that the mixture is the first to be deposited on the lower belt 11 or on the foil or other covering layer placed on it. The air nozzle 38 is arranged vertically so that the rovings 39 are again deposited in the form of approximately circular loops.

Figure 8:
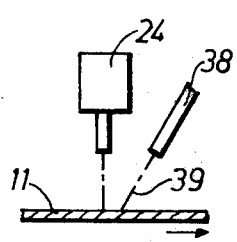

Elliptical loops are formed in FIG. 8.

Figure 9:
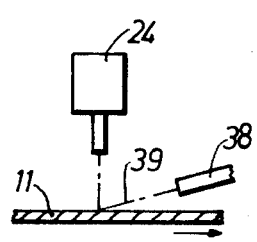

In FIG. 9 the loops of rovings are again elongated due to the flat lie of the air nozzle 38.

Common to all these three embodiments, FIGS. 7, 8 and 9, is that when the mixture foams up, the rovings 39 are lifted up with it and accumulate mainly in the upper part of the mixture. When the air nozzle 38 is arranged behind the mixing head 24 as shown in FIGS. 8 and 9, it may also be inclined in the direction shown in FIGS. 5 and 6.

By setting the air nozzle 38 at a suitable angle and suitably choosing the distance of the mouth 40 of the air nozzle 38 to the mouth 27 of the mixing nozzle 28, however, it is possible to achieve substantially homogeneous distribution of the rovings 39 over the cross-section of the foamed product. The distance of the mouths 40 and 27 from the lower belt 11 may also have some influence on the outcome.

Figure 10:
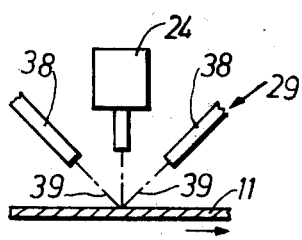

FIG. 10 represents a cross-section through the lower belt 11 as it is moving forwards (out of the drawing). The rovings delivery device 29 in this case consists of two air nozzles 38 arranged symmetrically on either side of the central axis of the mixing head 24. Mixing head 24 and air nozzles 38 lie in the same plane which is perpendicular to the plane of the belt.

The angle of the air nozzles 38 is so adjusted that the rovings 39 and reaction mixture encounter the lower belt 11 at the same point. The rovings 39 are in this case homogeneously distributed over the cross-section in the finished product.

The advance in fire resistance achieved by the process and apparatus according to the invention may be illustrated by the following examples.

Figure 11:
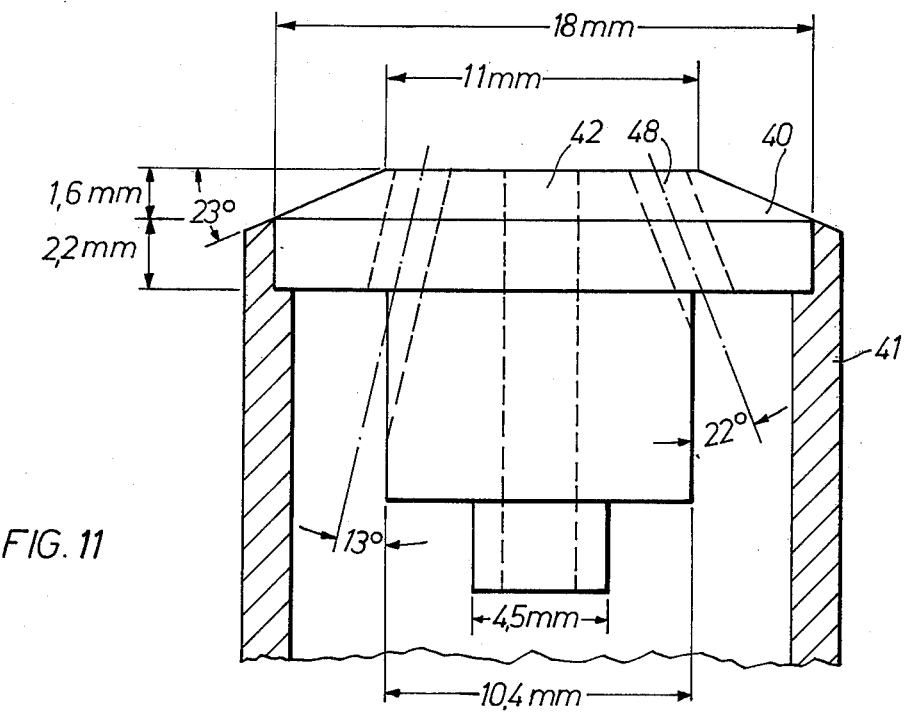
FIGS. 11 and 12 show an example for the air nozzle.
Figure 12:
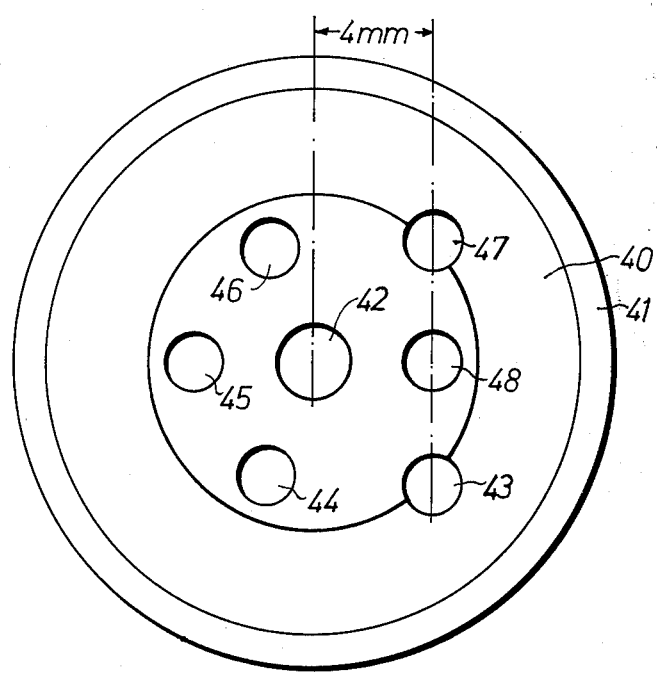

The nozzle head 40 is supplied with a pipe 41. The nozzle head 40 shows a central bore 42 of a diameter of 3 mm through which the rovings pass. The central bore 42 is surrounded by bores 43, 44, 45, 46 and 47 for air which have a diameter of 2 mm and are inclined under an angle of 13°C whereas bore 48 is inclined under an angle of 22°C to the central axis. The arrangement of the bores and all essential measurements are indicated in FIGS. 11 and 12 in millimeters.

The amount of glass fibres passing through bore 42 depends from the air pressure in an essentially linear proportion. According to a superatmospheric pressure of 3 to 12 atmospheres the amount of transported glass fibres increases from 200 to 1,500 g/mins.

EXAMPLES

EXAMPLE 1

Two wall section panels of polyisocyanate foam without covering layers and measuring 500 × 500 × 60 mm were tested according to DIN 4102, Completed Rules, 3. Edition of February 1970 (test device according to FIG. 2). The first wall section did not contain any glass rovings. Its fire resistance was only about 22 minutes. A second wall section which had the same thickness and dimensions but contained glass rovings homogeneously distributed over its cross-section was found to have a fire resistance of 35 minutes. For comparison, two wall sections with the same surface area as defined above but with a thickness of 80 mm were also tested. The section which was free from rovings was found to have a fire resistance of 25 minutes, but the section with glass rovings had a fire resistance of 80 minutes.

EXAMPLE 2

Two wall sections 3200 × 2350 mm in area and 80 mm in thickness covered with steel sheet 1 mm in thickness were tested. The wall section without glass fiber rovings had a fire resistance of 20 minutes and the one with rovings a resistance of about 50 minutes.

The advance achieved with the invention can be seen from these data.

The invention has been described with respect to certain preferred embodiments thereof. It is not intended to be limited to these embodiments, however, but instead is intended to include all embodiments included within the scope and spirit of the appended claims.

What is claimed is:

1. A method for producing a continuous fiber reinforced foam plastic web comprising:
   a. directing a continuous roving onto a moving support means by means of an air nozzle wherein the roving is deposited in the form of random loops and the angle between the air nozzle and the moving support is used to control the form of the loops formed in the roving as it is deposited;
   b. depositing a foamable reaction mixture onto said support means either before or after the deposition of said roving;
   c. allowing said mixture to foam and permeate said roving; and
   d. using the relative sequence and time lag between the mixture deposition and the roving deposition to control the ultimate position of the roving in the foamed web and to insure that the distribution of the roving is three dimensional such that the roving provides reinforcement for the web.

* * * * *